United States Patent
Rai et al.

(10) Patent No.: US 9,465,442 B2
(45) Date of Patent: Oct. 11, 2016

(54) OPTICAL PROXIMITY SENSOR SYSTEM HAVING REDUCED SENSITIVITY TO DISTINCT NEAR-FIELD OPTICAL EFFECTS

(71) Applicant: Apple Inc., Cupertino, CA (US)

(72) Inventors: Anant Rai, Sunnyvale, CA (US); Prashanth S. Holenarsipur, Fremont, CA (US); Alex M. Lee, Sunnyvale, CA (US); Richard Ruh, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 905 days.

(21) Appl. No.: 13/773,331

(22) Filed: Feb. 21, 2013

(65) Prior Publication Data

US 2014/0218340 A1     Aug. 7, 2014

Related U.S. Application Data

(60) Provisional application No. 61/760,971, filed on Feb. 5, 2013.

(51) Int. Cl.
| | |
|---|---|
| *G01S 17/02* | (2006.01) |
| *G06F 3/01* | (2006.01) |
| *G01S 7/497* | (2006.01) |
| *G01S 7/52* | (2006.01) |

(52) U.S. Cl.
CPC ............. *G06F 3/017* (2013.01); *G01S 17/026* (2013.01); *G01S 2007/4975* (2013.01); *G01S 2007/52009* (2013.01)

(58) Field of Classification Search
CPC ................ G06F 3/017; G01S 17/026; G01S 2007/4975; G01S 2007/52009
See application file for complete search history.

(56) References Cited

U.S. PATENT DOCUMENTS

| | | | |
|---|---|---|---|
| 6,298,780 | B1 | 10/2001 | Ben-Horin et al. |
| 6,835,923 | B2 | 12/2004 | Hamalainen et al. |
| 7,777,172 | B2 | 8/2010 | Hernoult |
| 8,189,429 | B2 | 5/2012 | Chen et al. |
| 2008/0006762 | A1* | 1/2008 | Fadell .................. G01J 1/4204 250/201.1 |
| 2011/0195187 | A1 | 8/2011 | Weber et al. |
| 2011/0223418 | A1* | 9/2011 | Habassi ........... B29D 11/00432 428/354 |
| 2012/0162646 | A1 | 6/2012 | Holzapfel |
| 2012/0175506 | A1 | 7/2012 | Wittenberg et al. |

OTHER PUBLICATIONS

S., Sandeep, "ZAGG invisibleSHIELD—Complete Protection for Nokia N97", http://blog.fommy.co.in, retrieved via Internet on Nov. 5, 2012, (Aug. 12, 2009).

\* cited by examiner

*Primary Examiner* — Francis M Legasse, Jr.
(74) *Attorney, Agent, or Firm* — Blakely, Sokoloff, Taylor & Zafman LLP (57) ABSTRACT

A portable electronic device including a proximity sensing device having an emitter and a detector. The electronic device further including a housing for containing the proximity sensing device which includes an optical interface forming a face of the housing through which radiation between the emitter and the detector pass. The optical interface may include an oleophobic coating which is selectively modified such that optical interference from an optical interface near-field object on the proximity sensing device is reduced without reducing a sensitivity of the proximity sensing device to a target near-field object.

20 Claims, 9 Drawing Sheets

OPTICAL PROXIMITY SENSOR SYSTEM HAVING REDUCED SENSITIVITY TO DISTINCT NEAR-FIELD OPTICAL EFFECTS

CROSS-REFERENCE TO RELATED APPLICATION

This application claims priority from U.S. Provisional Patent Application Ser. No. 61/760,971, filed on Feb. 5, 2013.

FIELD

An embodiment of the invention is directed to an optical proximity sensing device having reduced sensitivity to selective near-field optical effects at the device interface, more specifically an optical proximity sensing device having reduced sensitivity to smudge. Other embodiments are also described and claimed.

BACKGROUND

Portable handheld electronic devices, such as the iPhone multifunction device by Apple Inc., have a touch screen in their front face, where an earpiece speaker or receiver used for telephony is located. When the device is being held against the user's ear during a phone call, a proximity function automatically senses this condition using an infrared proximity sensing device that is built into the device, and on that basis turns off the touch sensitive display screen of the device. The proximity function can also automatically determine or measure when the device has moved away from the user's ear, in which case the touch screen is re-activated. This is achieved by measuring the signals of an infrared proximity sensing devices radiation emitter and complimentary radiation detector, where the emitter transmits an infrared signal that is reflected by a nearby object (e.g., the user's head) and picked up by the detector. A stronger received signal may be interpreted by the proximity function to mean that the object is closer, while a weaker received signal means the object is farther away.

There are two primary near-field optical effects that have an impact on performance of the proximity sensing device. The first effect is the proximity sensing device's response to near-field low-reflectivity targets, such as a dark target object. A dark target object is one that tends to absorb a greater amount of radiation than lighter objects, therefore the intensity of a return radiation ray reflected off of a dark target object may not accurately reflect the dark target object's location or proximity to the proximity sensing device. The second effect is the device's response when liquid impurities are deposited on the surface of the touch screen interface directly above the proximity sensing device, such as oil-based secretions from the user's skin. This is collectively referred to as 'smudge response.' In some cases, the touch screen interface may have a coating such as an oleophobic coating, which facilitates cleaning of these human secretions (i.e., smudge) off of the screen. This coating, however, can also cause the smudge to bead up and form flattened spheres. These flattened spheres can act as optical lenses or total internal reflecting cavities for infrared beams emitted by the radiation emitter. In such cases, the infrared beams are reflected back to the radiation detector without contacting any nearby object, providing a false indication of user presence.

Each of these competing near-field optical effects must, therefore, be balanced to maintain proper proximity sensing device operation. Since both are near-field optical effects, however, changes to the optical/geometrical design of the proximity sensing device, or the electronic device within which it is implemented, typically result in an increase (or reduction) of both effects on the same order of magnitude. Thus, if a sensitivity of the proximity sensing device to, for example, a dark target object is increased, the sensitivity to smudge response is also increased. An increase in smudge response, however, is not desirable.

SUMMARY

An embodiment of the invention is directed to balancing target near-field optical effects, specifically dark target effects, and smudge near-field optical effects to ensure proper proximity sensing device operation. In particular, it is desirable for a sensitivity of the proximity sensing device to smudge, also referred to generally herein as an optical interface near-field object, to be reduced while still maintaining the device's response to low reflectivity targets, referred to generally herein as target near-field objects. Thus, in one aspect, the invention is directed to reducing an optical interference caused by optical interface near-field objects (e.g., smudge) without reducing the device's response to target near-field objects (e.g., black hair). In one embodiment, this is done by selectively controlling or modifying a surface energy of an optical interface through which radiation from the proximity sensing device travels. The optical interface may, in some aspects, be a transparent face of an outer casing of the electronic device within which the proximity sensing device is integrated. The surface energy of the optical interface may be modified by, in some embodiments, forming openings in portions of an oleophobic coating formed on the optical interface, which are directly above the radiation emitter and/or radiation detector of the proximity sensing device. In other embodiments, the surface energy of the optical interface is modified by forming a transparent cover having a higher surface energy than the coating, over portions of the oleophobic coating directly above the radiation emitter and/or radiation detector.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section, we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known structures and techniques have not been shown in detail so as not to obscure the understanding of this description.

Figure 1A:
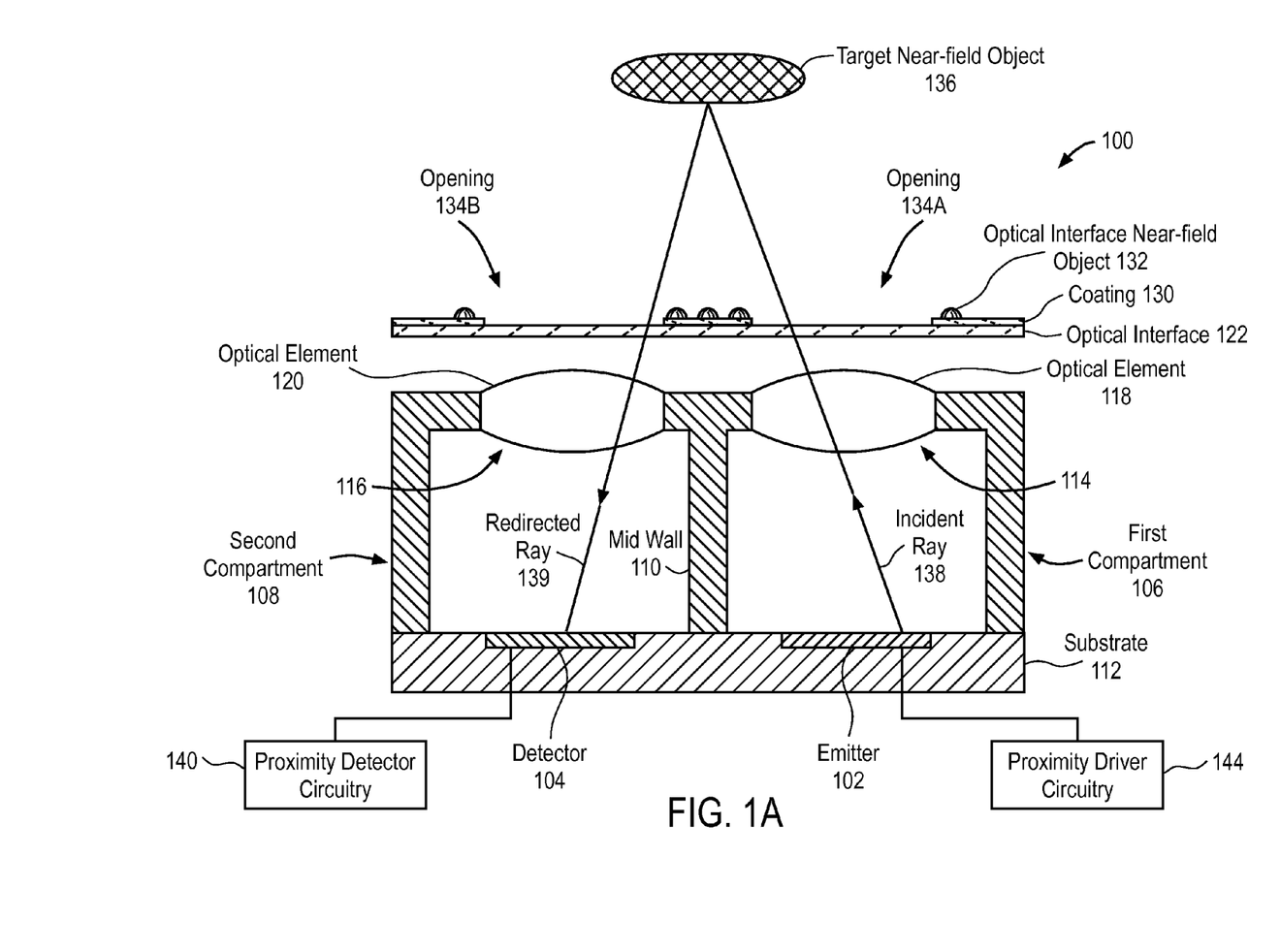
FIG. 1A is a cross-sectional side view of one embodiment of a sensing device.

FIG. 1A is a cross-sectional side view of one embodiment of a sensing device. In the illustrated embodiment, sensing device 100 includes a radiation emitter 102 and a radiation detector 104. The radiation emitter 102 may generate and emit radiation in, for example, the infrared (IR) bands. Representatively, radiation emitter 102 may be a semiconductor radiation source such as a light emitting diode (LED). The radiation detector 104 may be configured to sense changes in the intensity of radiation emitted from radiation emitter 102. For example, radiation detector 104 may detect a radiation beam emitted from radiation emitter 102 after it is reflected off of a nearby object (e.g., target near-field object 136). In this aspect, radiation detector 104 may provide a proximity sensing function. Representatively, radiation detector 104 may be a photodiode or other type of photodetector capable of sensing and converting IR radiation into a current or voltage that can then be processed by the device within which it is implemented to determine a proximity of the nearby object. In some embodiments, sensing device 100 may further include an ambient light sensor (ALS) integrated within radiation detector 104 or separate from radiation detector 104 to provide an ALS function to sensing device 100. The ambient light sensor may detect an intensity of ambient light from the surrounding environment and based on the intensity of light sensed, the device within which sensing device 100 is implemented, may modify its operation (e.g., display screen functionality and/or lighting).

Radiation emitter 102 may be mounted or formed within a portion of a substrate 112 within a first compartment 106 formed over substrate 112. Radiation detector 104 may be mounted or formed within a portion of substrate 112 within a second compartment 108. In one embodiment, substrate 112 is a printed circuit board (PCB) having traces, wire bond pads and vias disposed thereon or therein to facilitate transfer of electrical signals between radiation emitter 102, radiation detector 104 and the electronic device within which sensing device 100 is implemented. Radiation emitter 102 may also be electrically coupled to proximity driver circuitry 144 and radiation detector 104 may be electrically coupled to proximity detector circuitry 140. The circuitry may be signal processing circuitry that allows signals associated with the radiation emitter 102 and radiation detector 104 to be used by the electronic device to modify its operation (e.g., turn a display screen off).

The first and second compartments 106, 108 may be formed on opposing sides of a mid wall 110. Mid wall 110 extends from substrate 112 and prevents cross talk between radiation emitter 102 and radiation detector 104. Cross talk refers to an occurrence in which stray light from an emitter is detected by the detector, thereby causing an undesired false signal mimicking a true proximity or object detection signal. Mid wall 110 may therefore be made of any type of material capable of blocking emitter stray signals from the detector, for example, a ceramic, a metal, a polyimide or other similar material opaque to IR radiation.

Sensing device 100 may further include optical element 118 and optical element 120. Optical elements 118, 120 may be lenses fitted within openings 114, 116 formed within a top wall of each of compartments 106, 108. Optical element 118 is positioned over radiation emitter 102 such that light emitted from radiation emitter 102 passes through optical element 118 to the ambient environment. Optical element 120 is positioned over radiation detector 104 such that radiation from radiation emitter 102, which is reflected off a nearby object, can pass through optical element 120 to radiation detector 104. Each optical element 118, 120 may be configured to transmit and refract the incoming or outgoing light beams in the desired direction. For example, in some embodiments, optical elements 118, 120 may be drum lenses which can concentrate the transmitted light and therefore increase the amount of light focused at the nearby object or radiation detector 104. This is particularly advantageous in the case of proximity detection because it can increase proximity detection distances. It is to be understood, however, that although exemplary optical elements are described herein, such features are optional and may be omitted in some embodiments.

In some embodiments, an optical interface 122 may further be positioned over radiation emitter 102 and radiation detector 104. Optical interface 122 may be formed from a translucent or semi-translucent material such that it does not substantially modify the optical characteristics of sensing device 100. For example, in some embodiments, optical interface 122 is a glass (or plastic) window or cover which forms part of the portable electronic device in which sensing device 100 is implemented. For example, optical interface 122 may be a transparent face or cover of an outer casing of a mobile communications device which forms part of the display screen. Alternatively, optical interface 122 may be part of sensing device 100.

A coating 130 may further be formed over optical interface 122. In some embodiments, coating 130 is an oleophobic coating which modifies a surface energy at the interface between the sensing device and the ambient environment to help prevent oils and fluids from the user from sticking to optical interface 122. For example, in some cases, optical interface 122 is made of a glass material. Glass has a relatively high surface energy and liquids such as oil and water exhibit a high degree of adherence to such high surface energy surfaces. These adhesive forces between the liquid and the glass surface can, in turn, cause the liquid to spread across the surface making it difficult to remove from the glass. Coating 130 may therefore be an oleophobic coating which has a lower surface energy than glass and therefore allows oils and fluids from a user (as a result of their respective surface tensions) to form beads of fluid over the coating, which are easier to remove.

These beads of liquid, also referred to herein as optical interface near-field objects 132, however, can cause undesirable near-field optical effects at optical interface 122 (e.g., a smudge effect). In particular, optical interface near-field objects 132 may be reflective spheres formed at optical interface 122 which can reflect radiation emitted from radiation emitter 102 back toward radiation detector 104 (also known as false signals). In some cases, these false signals may have an intensity greater than, or similar to, an intensity of a radiation beam reflected off of a nearby target object, for example, the target near-field object 136. The proximity sensing function of sensing device 100 will, in turn, interpret these false signals to mean that a target near-field object is present when it really isn't and inactivate certain features of the device (e.g., the touch screen).

In general, it is desirable for a sensitivity of sensing device 100 to optical interface near-field objects 132, such as smudge or other beads of fluid, to be reduced while still maintaining a sensitivity of sensing device 100 to the target near-field object 136. This is particularly important to a performance of sensing device 100 in cases where the target near-field object 136 has a low reflectivity, for example, a dark object such as black hair. Thus, in one embodiment, the near-field optical effects caused by optical interface near-field objects 132 and target near-field object 136 are balanced by selectively modifying coating 130, and in turn optical interface 122, to reduce an optical interference caused by optical interface near-field objects 132 while still maintaining a sensitivity of sensing device 100 to target near-field objects 136.

In one embodiment, this may be done by modifying a surface energy of the surface areas directly above radiation emitter 102 and/or radiation detector 104 so that optical interface near-field objects 132 either do not form, or are reduced, within these regions. Representatively, FIG. 1A illustrates an embodiment in which openings 134A and 134B are formed within a proximity sensing area of coating 130, which is directly above radiation emitter 102 and radiation detector 104, respectively. In this aspect, a surface of optical interface 122 is exposed within openings 134A and 134B. As previously discussed, in cases where optical interface 122 is formed by a glass material and coating 130 is an oleophobic coating, optical interface 122 has a higher surface energy than coating 130. Thus, areas within openings 134A and 134B have a higher surface energy than areas outside of openings 134A and 134B. As a result of this higher surface energy, optical interface near-field objects 132 do not form in this region and therefore do not cause optical interference with an incident radiation ray 138 or a redirected radiation ray 139 of sensing device 100.

It is noted that although openings 134A and 134B are described as separate openings formed over each of radiation emitter 102 and radiation detector 104, it is contemplated that the openings may be combined into a single opening over both radiation emitter 102 and radiation detector 104 or over only one of radiation emitter 102 and radiation detector 104, for example, only over radiation emitter 102.

Figure 1B:
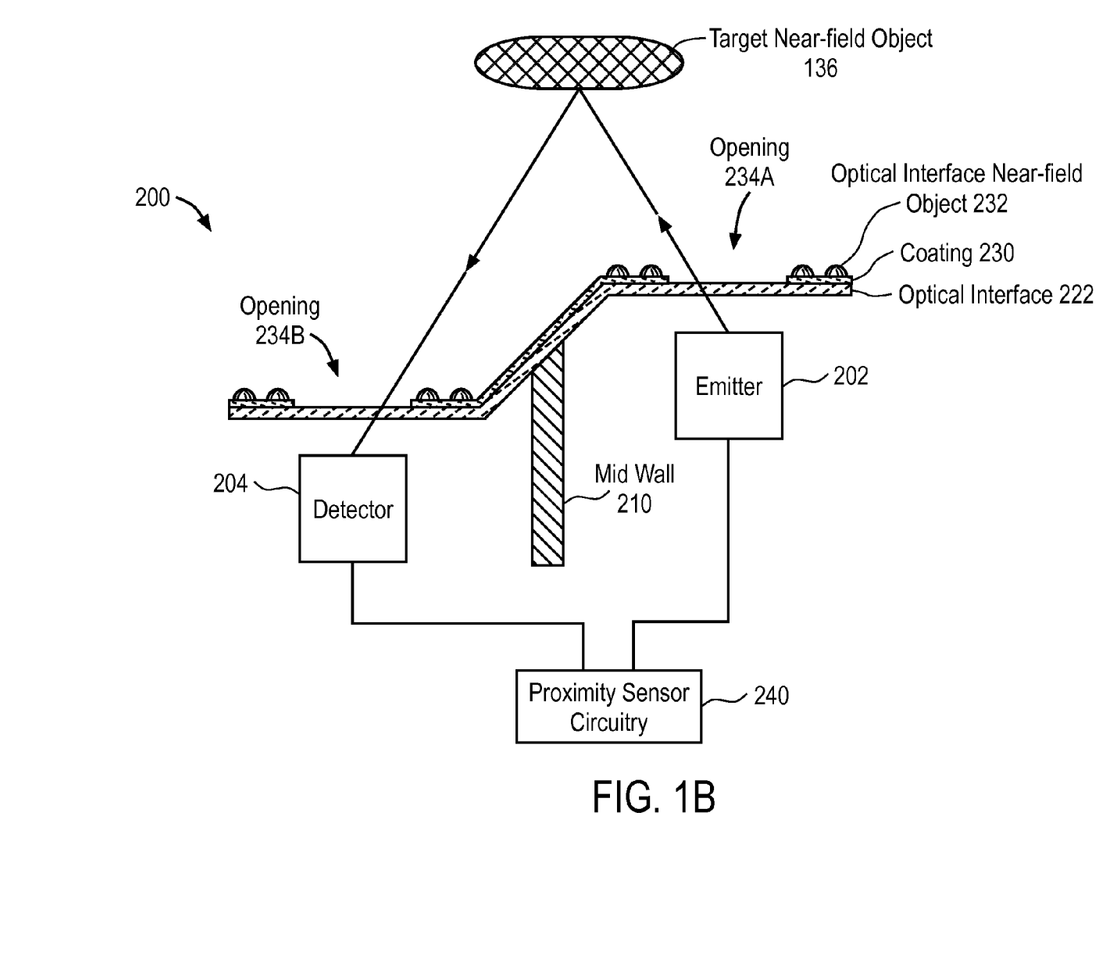
FIG. 1B is a cross-sectional side view of one embodiment of a sensing device.

Although FIG. 1A illustrates a substantially integrated proximity sensing device, it is contemplated that each of the sensing components need not be integrated within the same module. For example, FIG. 1B illustrates a cross-sectional side view of another embodiment of a sensing device having sensing components integrated within separate modules. Sensing device 200 is similar to sensing device 100 of FIG. 1A and includes substantially the same features except that in this embodiment, sensing device 200 includes a radiation emitter module 202 and a radiation detector module 204 which are formed as discrete units, instead of being integrated into the same proximity sensor module. Representatively, radiation emitter module 202 may include an optical element (e.g., optical element 118) and radiation emitter (e.g., emitter 102) electrically coupled to a substrate and proximity sensor circuitry 240. The substrate may be a printed circuit board (PCB) having traces, wire bond pads and/or vias disposed thereon or therein to facilitate transfer of electrical signals between the radiation emitter and the electronic device within which sensing device 200 is implemented. In addition, radiation detector module 204 may include an optical element (e.g., optical element 120) and a radiation detector (e.g., detector 104) electrically coupled to a substrate (a PCB) and proximity sensor circuitry 240. The radiation detector module substrate may be a different substrate than the radiation emitter module substrate such that the radiation emitter module 202 and the radiation detector module 204 can be placed at different levels, positions, regions, etc., of the electronic device within which the sensing device 200 is implemented. Proximity sensor circuitry 240 should be understood as including both radiation emitter circuitry and radiation detector circuitry that allows signals associated with the radiation emitter and the radiation detector to be used by the electronic device to modify its operation (e.g., turn a display screen off).

A mid wall 210 may further be provided to prevent cross talk between radiation emitter module 202 and radiation detector module 204. Mid wall 210 may therefore be made of any type of material capable of blocking emitter stray signals from the detector, for example, a ceramic, a metal, a polyimide or other similar material opaque to IR radiation.

In some embodiments, an optical interface 222 may further be positioned over radiation emitter module 202 and radiation detector module 204. Optical interface 222 may be substantially similar to optical interface 122 of FIG. 1A in that it can be formed from a translucent or semi-translucent material such that it does not substantially modify the optical characteristics of sensing device 200. For example, in some embodiments, optical interface 222 is a glass (or plastic) window or cover which forms part of the portable electronic device in which sensing device 200 is implemented. For example, optical interface 222 may be a transparent face or cover of an outer casing of a mobile communications device which forms part of the display screen. Alternatively, optical interface 222 may be part of sensing device 200. Moreover, since in this embodiment, radiation emitter module 202 and radiation detector module 204 are discrete units, optical interface 222 may have a stepped configuration to accommodate the different positions of radiation emitter module 202 and radiation detector module 204.

Figure 2A:
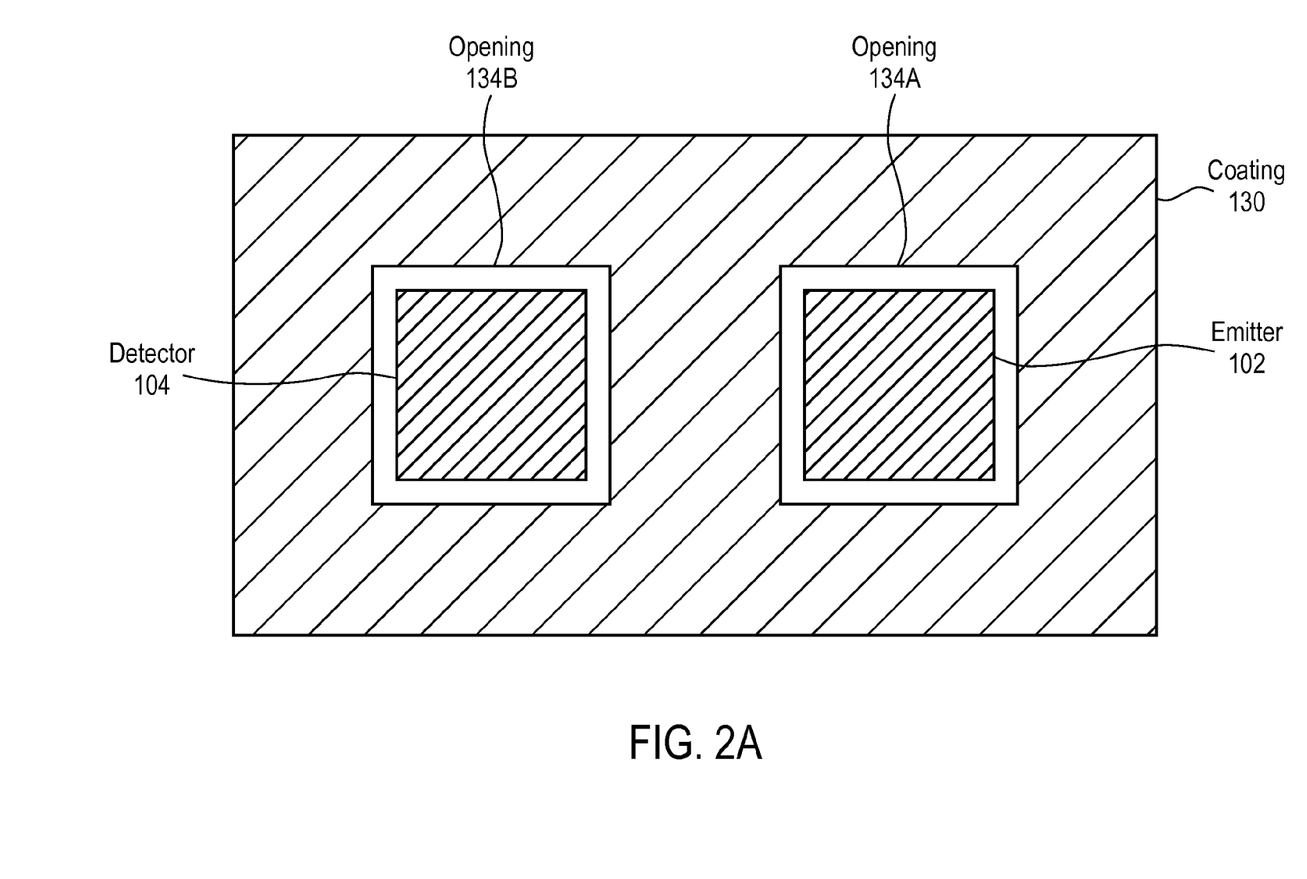
FIG. 2A is a top plan view of one embodiment of the sensing device of FIG. 1A and/or FIG. 1B.

A coating 230 may further be formed over optical interface 222. In some embodiments, coating 230 is an oleophobic coating which modifies a surface energy at the interface between the sensing device and the ambient environment to help prevent oils and fluids from the user from sticking to optical interface 222. Similar to coating 130 described in reference to FIG. 1A, a surface energy of coating 230 may be modified at surface areas directly above radiation emitter module 202 and/or radiation detector module 204 so that optical interface near-field objects 232 either do not form, or are reduced, within these regions. Representatively, FIG. 2A illustrates an embodiment in which openings 134A and 134B (or openings 234A and 234B of FIG. 1B) are formed within a proximity sensing area of coating 130 (or coating 230 of FIG. 1B), which is directly above radiation emitter module 202 and radiation detector module 204, respectively. In this aspect, a surface of optical interface 222 is exposed within openings 234A and 234B.

Figure 2B:
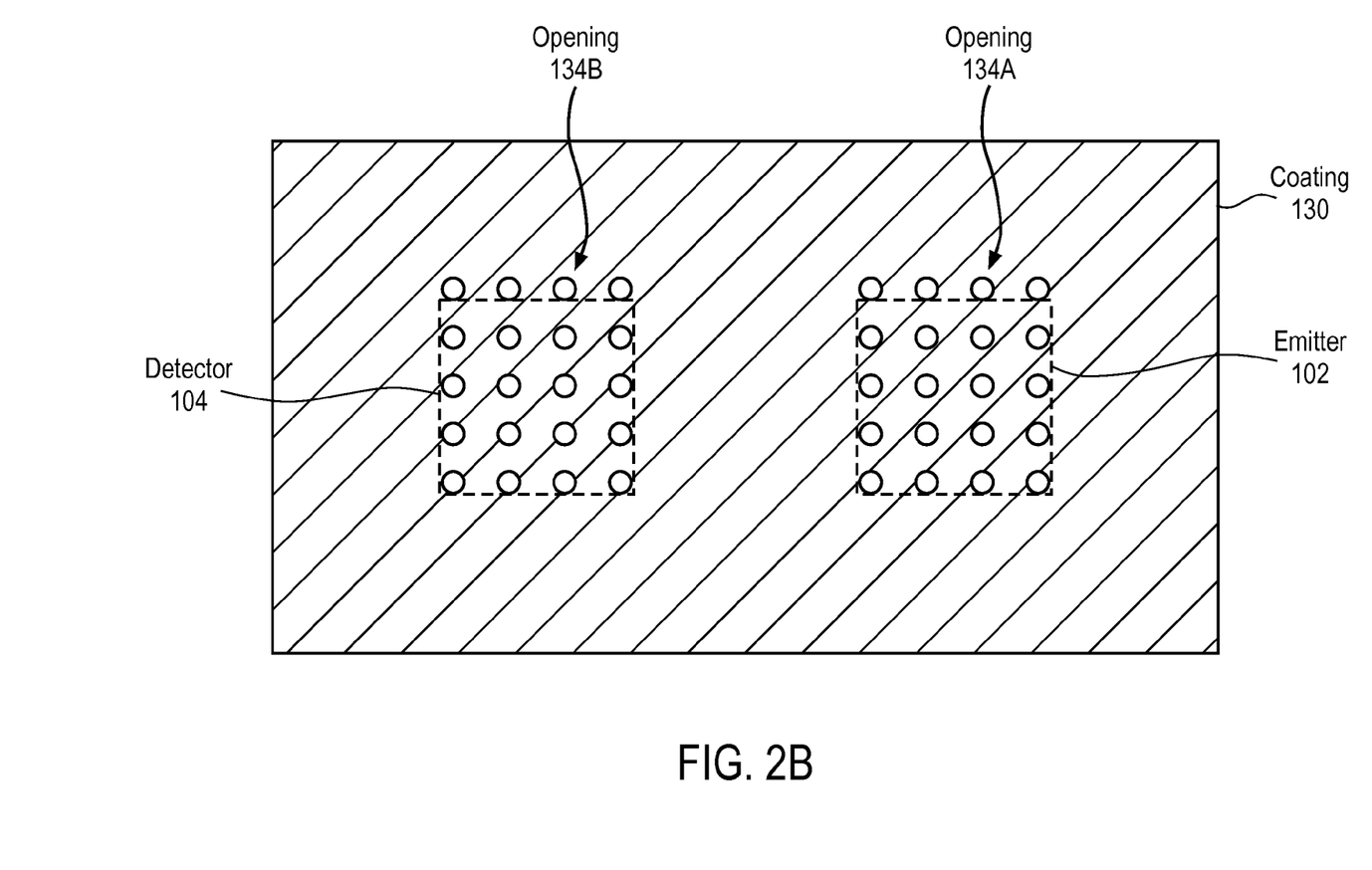
FIG. 2B is a top plan view of another embodiment of the sensing device of FIG. 1A and FIG. 1B.

FIG. 2A and FIG. 2B each illustrate a top plan view of embodiments of the sensing device of FIG. 1A and FIG. 1B. FIG. 2A illustrates an embodiment in which openings 134A and 134B (or openings 234A and 234B) are cut-outs which open up an entire region of coating 130 directly above radiation emitter 102 and radiation detector 104. In other embodiments, as illustrated by FIG. 2B, openings 134A and 134B (or openings 234A and 234B) are patterned cut-outs in which less than the entire region of coating 130 directly above radiation emitter 102 and radiation detector 104 are open. For example, openings 134A and 134B may be formed by a pattern of circular openings formed within coating 130. Although circular openings are illustrated, it is contemplated that the patterned cut-out may include several smaller openings of any size, shape and in any arrangement sufficient to reduce an optical interference caused by optical interface near-field objects 132. For example, the pattern may be formed by scratches, hash marks, squares, elongated openings, or any other type of opening sufficient to reduce an optical interference caused by optical interface near-field objects 132. It is believed that since the higher surface energy material of the underlying optical interface 122 is exposed to the ambient environment through the pattern of cut-outs, optical interface near-field objects 132 will not form, or will be reduced, within these regions directly above radiation emitter 102 and radiation detector 104.

Openings 134A and 134B (or openings 234A and 234B) may be formed within coating 130 (or coating 230) in any manner. Representatively, in one embodiment, coating 130 (or coating 230) is an oleophobic coating which includes an oleophobic ingredient that can be bonded to optical interface 122. The oleophobic ingredient is provided as part of a liquid material that is applied to optical interface 122 by a chemical deposition process and openings 134A and 134B are formed by a masking process. For example, in one embodiment, a masking material may be deposited onto portions of optical interface 122 directly above radiation emitter 102 and radiation detector 104 prior to depositing the oleophobic material used to form coating 130 (or coating 230) onto optical interface 122. The masking material may be deposited in the size and shape of openings 134A and 134B. Next, the oleophobic coating material may be deposited over optical interface 122, including the masking material. The masking material may then be removed leaving openings 134A and 134B within the desired regions of coating 130 (or coating 230). Alternatively, in other embodiments, openings 134A and 134B may be formed by a mechanical abrasion, chemical etching or selective patterning process after coating 130 (or coating 230) is formed on optical interface 122. Regardless of the application process, it is to be understood that coating 130 (or coating 230) includes an oleophobic ingredient which is permanently bonded to optical interface 122 during a manufacturing process, prior to release of sensing device 100 or 200 into the field to a consumer.

Figure 3:
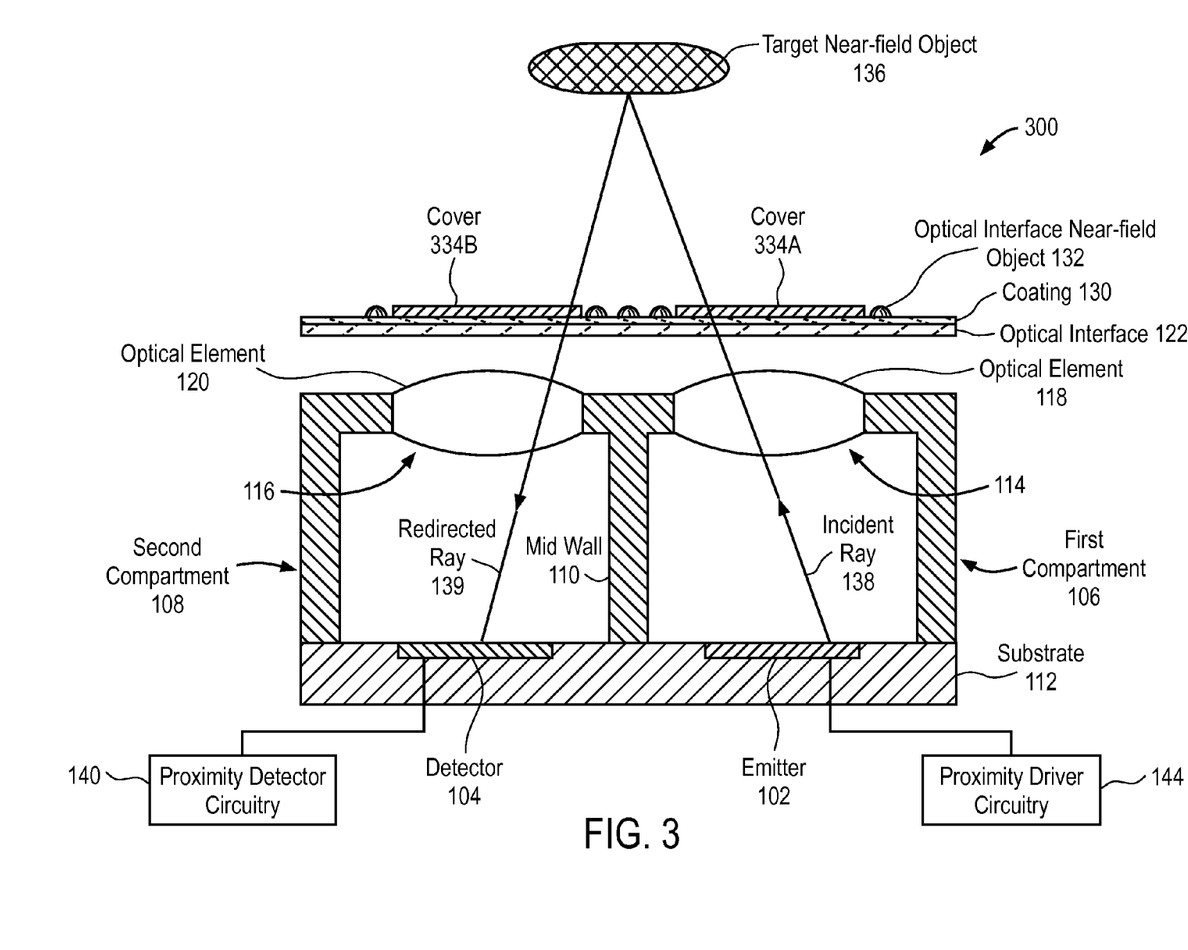
FIG. 3 is a cross-sectional side view of one embodiment of a sensing device.

FIG. 3 is a cross-sectional side view of one embodiment of a sensing device. Sensing device 300 is substantially similar to sensing device 100 described in reference to FIG. 1A, therefore the description of features previously provided in reference to FIG. 1A are not repeated with respect to sensing device 300; however, they should be understood as applying to sensing device 300. In addition to the previously discussed features, however, in this embodiment, optical covers 334A and 334B are formed over portions of coating 130 directly above radiation emitter 102 and radiation detector 104 to modify a surface energy within these regions. In particular, as previously discussed, optical interface near-field objects 132 (e.g., beads of liquid or smudge) will not form, or their formation will be reduced, on surfaces such as glass which have a high surface energy. Therefore, in this embodiment, coating 130 is formed over the entire optical interface 122. Instead of forming openings over radiation emitter 102 and radiation detector 104, optical covers 334A and 334B formed of a high surface energy material (e.g., glass) are placed on coating 130 directly above radiation emitter 102 and radiation detector 104. Since optical covers 334A and 334B have a relatively high surface energy (as compared to coating 130), optical interface near-field objects 132 do not form, or are reduced, within these regions resulting in a reduction in the undesirable near-field optical effects (e.g., false signals) caused by optical interface near-field objects 132. In addition, since there is less interference from optical interface near-field objects 132, it is believed that a sensitivity of sensing device 100 to target near-field objects 136, particularly dark target objects, may be improved. Although glass is provided as one example, optical covers 334A and 334B may be formed of any similarly optically transparent material having a high surface energy.

Figure 4:
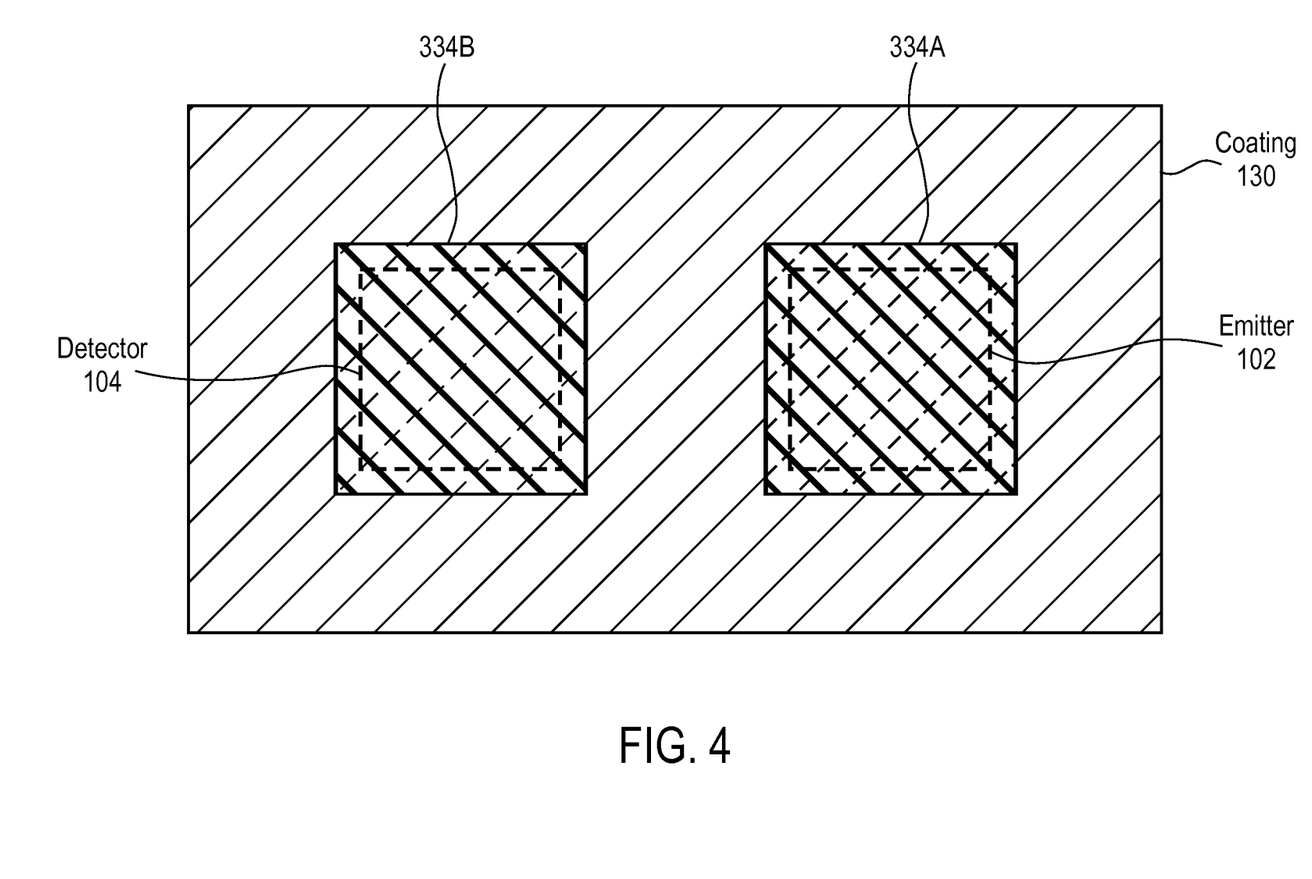
FIG. 4 is a top plan view of another embodiment of the sensing device of FIG. 3.

Each of optical covers 334A and 334B may have any thickness and dimensions sufficient to improve a performance of sensing device 300 as previously discussed. Representatively, as illustrated in FIG. 4, in one embodiment, optical covers 334A and 334B are of a size and shape (e.g., square) sufficient to cover a portion of coating 130 directly above each of radiation emitter 102 and radiation detector 104. In addition, optical covers 334A and 334B are shown as substantially solid structures, however, it is contemplated that they may be patterned with cut-outs as previously discussed.

It is further noted that although optical covers 334A and 334B are used to modify the surface energy of an optical interface formed over a sensing device similar to that of FIG. 1A, it is contemplated that optical covers 334A and 334B may further be used to modify the surface energy of an optical interface formed over sensing device 200 described in reference to FIG. 1B. In other words, sensing device 300 could include discrete emitter and detector modules as described in reference to FIG. 1B.

Figure 5:
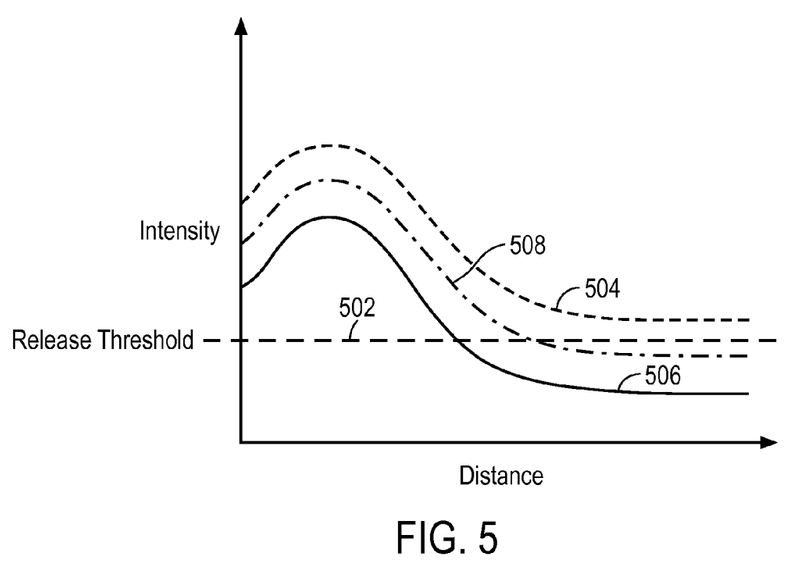
FIG. 5 illustrates one embodiment of an optical interface near-field optical effect on a sensing device.

FIG. 5 illustrates an optical interface near-field optical effect (e.g., smudge) on a sensing device. In FIG. 5, the x-axis represents a distance of a target object from an optical interface (e.g., a glass window) and the y-axis represents an intensity of a return signal detected by the sensing device. A typical usage scenario is represented by signal 506. As the target object approaches the sensor, incident rays from the emitter are reflected back to the detector, resulting in an increased return signal. The magnitude of the return signal increases as the target gets closer to the sensor. The proximity function is configured to have a predetermined release threshold 502 which triggers the proximity function to activate or deactivate various features of the device within which the proximity sensing device is implemented (e.g., the touch screen). For example, when the detected intensity signals are determined to be above release threshold 502, the device features are deactivated, and when the return signals are below the release threshold 502, it is interpreted as the target object having moved away from the sensor interface and the device features are activated. An alternative implementation sets distinct thresholds for activation and deactivation. As previously discussed, optical interface near-field objects such as liquid beads caused by smudge result in additional reflected signal. This manifests as a high intensity signal 504, which is offset from typical target response signal 506 by the amount of signal resulting from reflections associated with smudge (also known as smudge response). As can be seen from FIG. 5, an intensity of signal 504, which is a false signal, is determined to be above release threshold 502, therefore aspects of the sensing device will be deactivated at all times, even when there is no actual target object (e.g., a user's face). Such a response is undesirable.

By modifying the surface tension within areas of the surface overlying the radiation emitter and/or detector of the sensing device as previously discussed, however, optical interference from optical interface near-field objects can be reduced. This, in turn, results in a lower intensity return signal 508, which more accurately reflects the proximity of near-field target objects to the sensing device. Since signal 508 passes below release threshold 502, it is not interpreted by the proximity function as a target object and aspects of the associated electronic device can remain active.

Figure 6:
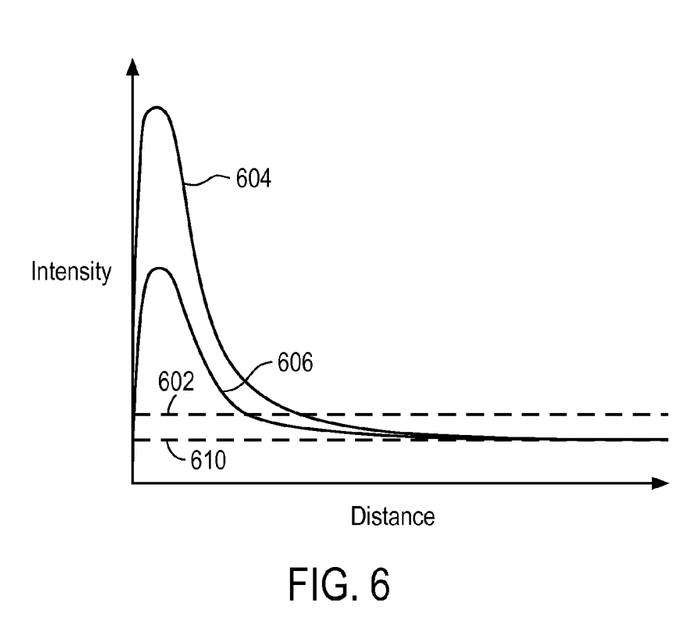
FIG. 6 illustrates one embodiment of a target near-field optical effect on a sensing device.

FIG. 6 illustrates a target near-field optical effect on a sensing device. In FIG. 6, the x-axis represents a distance of an object, in this case a target near-field object (e.g. a user), from an optical interface (e.g., a glass window) and the y-axis represents an intensity of a return signal detected by the sensing device. In this case, the target near-field object may be a dark object (e.g., black hair), which poorly reflects radiation back to the sensing device. In this aspect, the intensity of the return signal 606 from the dark object is relatively low (as measured from baseline 610), in comparison to the return signal 604 from a lighter object at the same distance. If dark object return signal 606 falls below release threshold 602, it is interpreted by the proximity function to mean that a target object is not nearby and therefore features such as the touch screen should remain active. Such a response, however, is undesirable since a target object is actually nearby. Typically, any optical design changes to the proximity sensor system that are intended to increase (or reduce) the sensor's response to either near-field targets (e.g., black hair) or optical interference near-field optical effects (e.g., smudge) will increase (or reduce) both by the same order of magnitude. The invention described herein solves this problem by selectively modifying the surface energy of the optical interface to reduce interference near-field optical effects without having an impact on target near-field optical effects.

Figure 7:
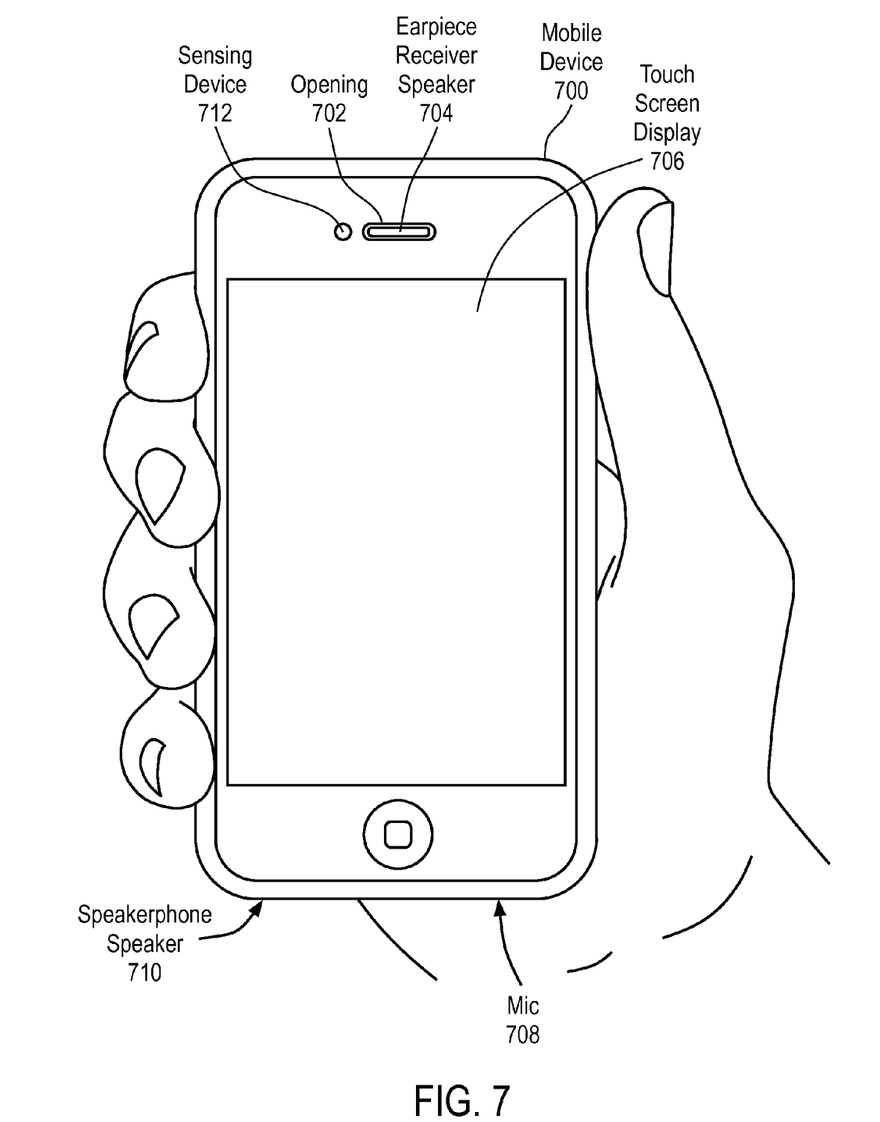
FIG. 7 is a perspective view of a handheld device within which embodiments of a sensing device may be implemented.

Turning now to FIG. 7, this figure depicts an example embodiment of a portable handheld device 700 having a sensing device 712 implemented therein. Sensing device 712 may be substantially similar to the sensing devices previously discussed in reference to FIGS. 1A-4. In this illustration, a near end user is holding the device 700 in their hand. Sensing device 712 may be positioned within an outer casing of handheld device 700 near a front face of handheld device 700 so that it can sense a proximity of a user when the user draws the phone toward their face. It is contemplated, however, that sensing device 712 may be associated with other portions of handheld device 700, for example, a bottom, a top or a side portion of handheld device 700. In one embodiment, opening 702 may be associated with an earpiece receiver speaker 704. In some embodiments, opening 702 may be configured to accommodate both an earpiece receiver speaker 704 and another component, such as an audio proximity sensing device.

Handheld device 700 may include various capabilities to enable the user to access features involving, for example, calls, text messages, voicemail, e-mail, the Internet, scheduling, photos, and music as shown on the touch screen display 706. In addition, handheld device 700 may include a microphone 708 and speakerphone speaker 710 to allow for input and/or output of audio signals to and from handheld device 700. When the user holds the handheld device 700 to their head during a call in, for example, the device handset mode, the earpiece receiver speaker 704 (which may be located at a top end portion of the handheld device 700) may be positioned against the user's ear. In that case, the sensing device 712 is situated in the general direction of the user. An emitter within sensing device 712 emits, for example, an IR light beam through the front face (which is formed by a transparent window or casing). The light beam is then reflected off of the user, and a based on the intensity of the beam, handheld device 700 can determine a proximity of the user, and for example, disable the touch screen display 706 when the handheld device 700 is determined to be close to the user's face. In addition, when sensing device 712 detects a relatively low ambient light intensity level, the display lighting may be reduced, for example, to conserve battery power.

It is to be understood that although a handheld device such as an iPhone® from Apple Computer, Inc. of Cupertino, Calif., is illustrated in FIG. 7, any of the sensing devices disclosed herein may be implemented within any number of electronic devices that could benefit from a light and proximity sensing device. For example, sensing device 712 may be implemented within a tablet computer, a notebook computer or other portable computing device. In still further embodiments, sensing device 712 may be implemented within a digital media player, such as a portable music and/or video media player, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 8:
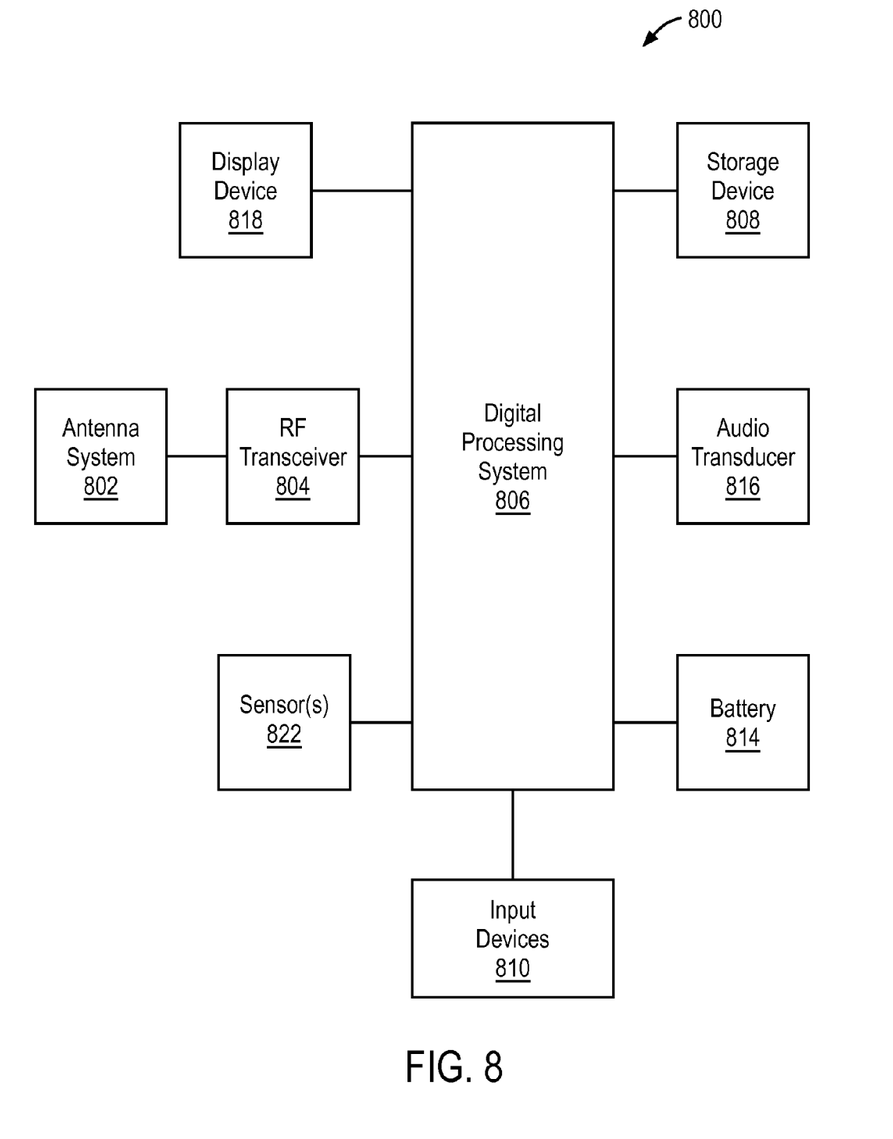
FIG. 8 is a block diagram of a system in which embodiments of a sensing device may be implemented.

FIG. 8 shows a block diagram of an embodiment of a wireless device 800 within which sensing device 712 may be implemented. In the illustrated embodiment, wireless device 800 is a wireless communication device. The wireless device 800 may be included in the device shown in FIG. 7, although alternative embodiments of handheld device 700 may include more or fewer components than the wireless device 800.

Wireless device 800 may include an antenna system 802. Wireless device 800 may also include a radio frequency (RF) transceiver 804, coupled to the antenna system 802, to transmit and/or receive voice, digital data and/or media signals through antenna system 802.

A digital processing system 806 may further be provided to control the digital RF transceiver and to manage the voice, digital data and/or media signals. Digital processing system 806 may be a general purpose processing device, such as a microprocessor or controller for example. Digital processing system 806 may also be a special purpose processing device, such as an ASIC (application specific integrated circuit), FPGA (field-programmable gate array) or DSP (digital signal processor). Digital processing system 806 may also include other devices to interface with other components of wireless device 800. For example, digital processing system 806 may include analog-to-digital and digital-to-analog converters to interface with other components of wireless device 800.

A storage device 808, coupled to the digital processing system, may further be included in wireless device 800. Storage device 808 may store data and/or operating programs for the wireless device 800. Storage device 808 may be, for example, any type of solid-state or magnetic memory device.

One or more input devices 810, coupled to the digital processing system 806, to accept user inputs (e.g., telephone numbers, names, addresses, media selections, etc.) or output information to a far end user may further be provided. Exemplary input devices may be, for example, one or more of a keypad, a touchpad, a touch screen, a pointing device in combination with a display device or similar input device.

Display device 818 may be coupled to the digital processing system 806, to display information such as messages, telephone call information, contact information, pictures, movies and/or titles or other indicators of media being selected via the input device 810. Display device 818 may be, for example, an LCD display device. In one embodiment, display device 818 and input device 810 may be integrated together in the same device (e.g., a touch screen LCD such as a multi-touch input panel which is integrated with a display device, such as an LCD display device). It will be appreciated that the wireless device 800 may include multiple displays.

Battery 814 may further be provided to supply operating power to components of the system including digital RF transceiver 804, digital processing system 806, storage device 808, input device 810, audio transducer 816, sensor(s) 822 (e.g., sensing device 712), and display device 818. Battery 814 may be, for example, a rechargeable or non-rechargeable lithium or nickel metal hydride battery. Wireless device 800 may also include audio transducers 816, which may include one or more speakers, receivers and at least one microphone.

Sensor(s) 822 may be coupled to the digital processing system 806. The sensor(s) 822 may include, for example, one or more of a light and/or proximity sensor. Based on the data acquired by the sensor(s) 822, various responses may be performed automatically by the digital processing system, such as, for example, activating or deactivating the backlight, changing a setting of the input device 810 (e.g., switching between processing or not processing, as an intentional user input, any input data from an input device), and other responses and combinations thereof. It is noted that other types of sensors may also be included in wireless device 800, such as an accelerometer, touch input panel, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof.

Sensor(s) 822 may include one or more ALS or proximity sensors (e.g., sensing devices 712) which provide data relating to light (e.g., radiation emitted from radiation emitter 102). The data can be analyzed by digital processing system 806 to determine whether or not to adjust one or more settings of wireless device 800.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, in embodiments where the emitter and the detector are separate modules, they may be mounted in separate portions of an electronic device and the optical interface having a modified surface tension may be two separate interfaces (e.g., two separate windows) formed over their respective emitter and detector modules and one or both of the interfaces may have a modified surface tension. The description is thus to be regarded as illustrative instead of limiting.

What is claimed is:

1. A portable electronic device comprising:
    a proximity sensing device having an emitter and a detector;
    a housing for containing the proximity sensing device; and
    an optical interface forming a face of the housing through which radiation between the emitter and the detector pass, wherein the optical interface comprises an oleophobic coating defining a first region and a second region over the optical interface, wherein the first region and the second region have a different optical property such that optical interference from an optical interface near-field object on the proximity sensing device is reduced without reducing a sensitivity of the proximity sensing device to a target near-field object.

2. The portable electronic device of claim 1 wherein the optical interface near-field object is smudge formed at the optical interface.

3. The portable electronic device of claim 1 wherein the target near-field object is an object the sensing device is designed to be responsive to.

4. The portable electronic device of claim 1 wherein the optical interface comprises a glass window forming a display screen of the portable electronic device.

5. The portable electronic device of claim 4 wherein the oleophobic coating is formed on an outer surface of the glass window.

6. The portable electronic device of claim 1 wherein the first region comprises an opening in the oleophobic coating that is directly over one of the emitter or the detector.

7. The portable electronic device of claim 1 wherein the first region is directly above the emitter or the detector and a glass cover is positioned over a portion of the oleophobic coating in the first region.

8. A portable multi-function personal device comprising:
    a proximity sensor system having:
        an optical interface cover; and
        an optical emitter and an optical detector positioned below the cover, the cover having been treated to exhibit decreased surface tension on its top surface except for a proximity sensor area directly above the optical emitter and the optical detector where radiation from the optical emitter and the optical detector passes.

9. The portable multi-function personal device of claim 8 wherein the cover is made of glass.

10. The portable multi-function personal device of claim 8 wherein a top surface of the cover is treated with an oleophobic coating having openings in the proximity sensor area.

11. The portable multi-function personal device of claim 8 wherein an oleophobic coating applied to a top surface of the cover is patterned to expose a plurality of smaller areas in the larger proximity sensor area.

12. The portable multi-function personal device of claim 8 wherein an optically transparent film is positioned within the proximity sensor area.

13. The portable multi-function personal device of claim 8 wherein an oleophobic coating and a glass cover are positioned within the proximity sensor area.

14. A proximity sensing system having a modified response to near-field optical effects comprising:
- a portable electronic device having an outer casing comprising an optically transparent face;
- a proximity sensing device positioned within the outer casing, the proximity sensing device having an optical emitter and an optical detector facing the optically transparent face such that radiation from the emitter passes through the optically transparent face; and
- an oleophobic coating formed on a side of the optically transparent face opposite the proximity sensing device, the oleophobic coating having at least one optically modified portion positioned over the optical emitter or the optical detector such that optical interference from an optical interface near-field object on the proximity sensing device is reduced without reducing a sensitivity of the proximity sensing device to a target near-field object.

15. The system of claim 14 wherein the optical interface near-field optical object is a smudge formed on the oleophobic coating.

16. The system of claim 14 wherein the optically modified portion does not modify a response of the proximity sensing device to a target near-field optical effect.

17. The system of claim 14 wherein the optically modified portion is a patterned cut out formed in the oleophobic coating.

18. The system of claim 14 wherein the optically modified portion has a different surface energy than the rest of the optically transparent face.

19. The system of claim 14 wherein the optically modified portion comprises a transparent material capable of modifying a surface energy of the oleophobic coating.

20. The system of claim 14 wherein the optically modified portion comprises a glass cover positioned over the oleophobic coating.

* * * * *